Jan. 19, 1954 W. H. WOLOWITZ 2,666,655
IDENTIFICATION CARD OR THE LIKE
Filed Aug. 15, 1950 2 Sheets-Sheet 1
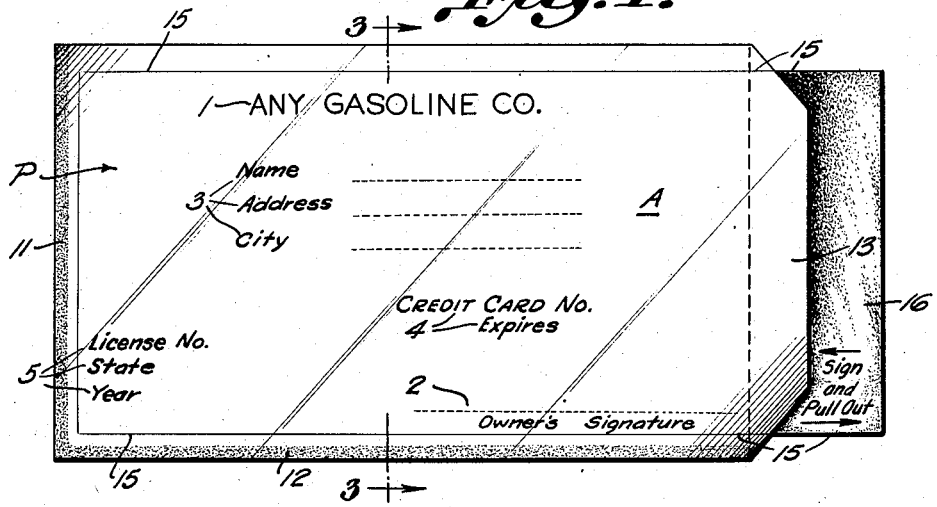
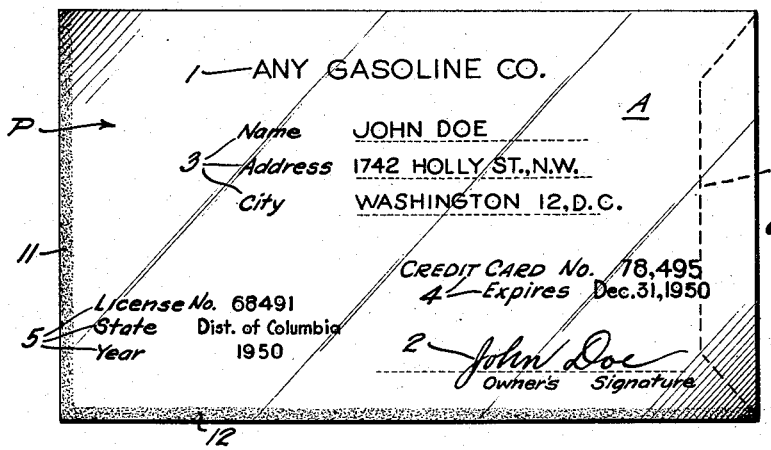
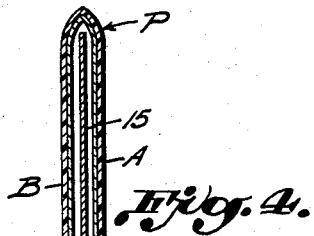
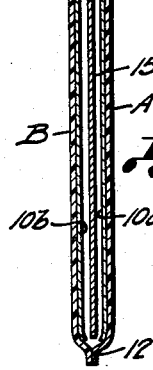
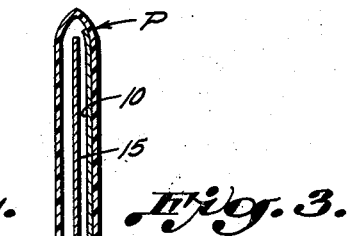
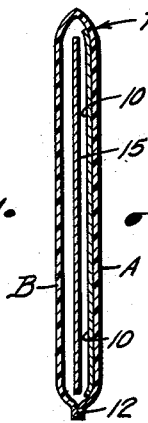
INVENTOR
WILLIAM H. WOLOWITZ
BY
H. G. Lombard
ATTORNEY Jan. 19, 1954 W. H. WOLOWITZ 2,666,655
IDENTIFICATION CARD OR THE LIKE
Filed Aug. 15, 1950 2 Sheets-Sheet 2
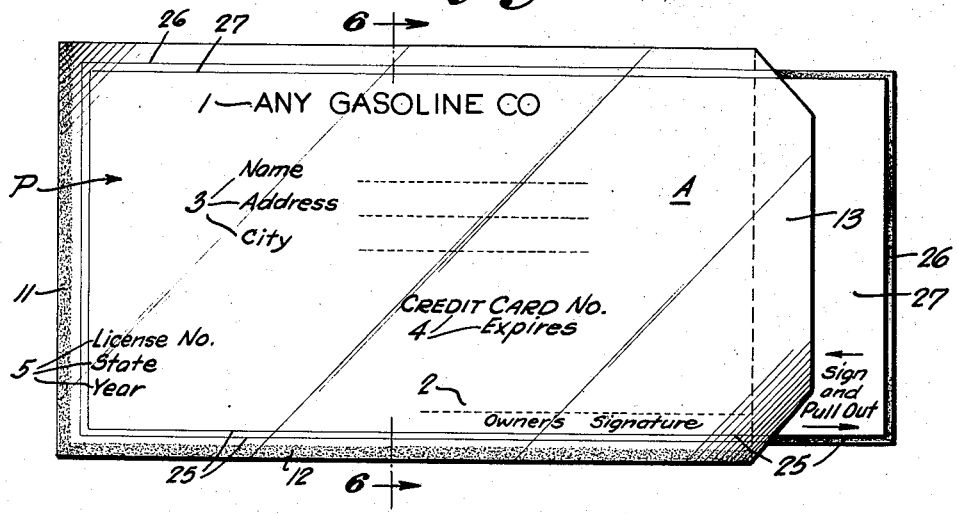
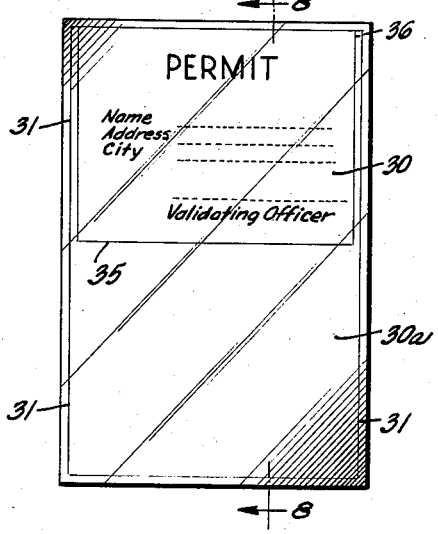
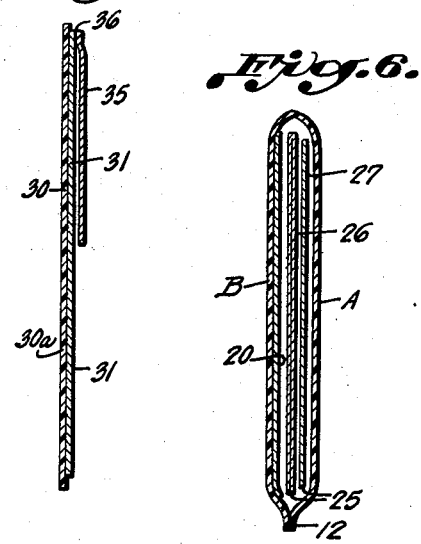
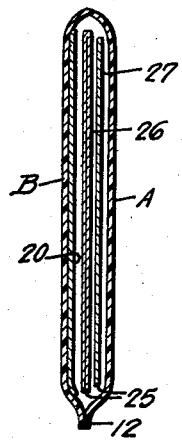
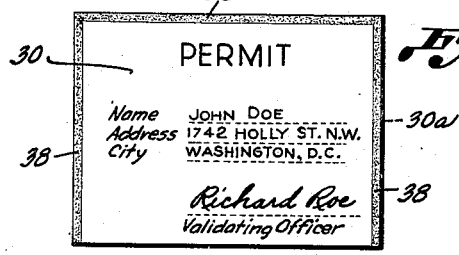
INVENTOR
WILLIAM H. WOLOWITZ
BY
ATTORNEY Patented Jan. 19, 1954

2,666,655

UNITED STATES PATENT OFFICE 2,666,655

IDENTIFICATION CARD OR THE LIKE

William H. Wolowitz, Washington, D. C.

Application August 15, 1950, Serial No. 179,583

1 Claim. (Cl. 282—25)

This invention relates, in general, to documents or instruments provided with a protective surface, and deals, more particularly. with the provision of documents and instruments within a protective case or shield and adapted to be provided with data or information while sealed within such protective case or shield. The present application is a continuation in part of prior copending application Serial Number 111,902 filed August 23, 1949, and issued as United States Patent Number 2,520,077 on August 22, 1950.

Many business establishments have a charge or credit system wherein the customers are furnished with an identification device, commonly referred to as a credit card, bearing, among other information, the name and address of the customer entitled to use the card, a statement as to the duration of validity of the card, a space for the signature of the customer, and other related data. The signature of the customer on the credit or identification card is used to verify the signature of the customer on a sales ticket, for example, at the time of a transaction to guard against fraudulent or unauthorized use of the credit or identification card. Frequently the fraudulent use of a credit card, or the like, goes undetected by reason of a skillful change or alteration in the signature or other data on the credit card, and, in many large scale establishments, such losses involve a very sizable amount. In order to prevent change or alteration of a signature or other data on such identification cards, the cards have been furnished in sealed cases which, of course, requires that the customer be present to sign the card before it is inserted into the case and the case sealed. This procedure is not practical in many instances, as, for example, in the case of a large concern using a system in which new credit cards are issued periodically for suitable credit control, and such cards mailed to the customers.

One of the primary objects of this invention is to provide an improved construction and arrangement of a sealed case or shield for an identification card, or the like, wherein the case or shield is provided with a data surface on which a signature or other writing or marking may be inscribed while sealed in the case, and which signature or other writing is not accessible for change or alteration without mutilating or destroying the case.

A further object of the invention is to provide an improved construction and arrangement for a sealed card case or shield, or the like, of this character, which comprises a removable reproducing means by which a signature or other writing or marking may be inscribed on the data surface sealed within the case, and said reproducing means thereafter removed so that the completed card or document is sealed within the case and protected against any change or alteration in the signature or other inscription thereon.

Another object of the invention is to provide, in general, an improved, simplified and inexpensive arrangement for a protected document or other instrument comprising a transparent or translucent plastic sheet having a data surface on its rear face for carrying data which is visible from the front face of the transparent plastic sheet and is protected by said front face of the plastic sheet against soiling and wear.

Further objects and advantages, on other new and useful features of the invention will be apparent as the following description proceeds with reference to the accompanying drawings, for purposes of illustration and not of limitation, in which like reference characters designate like parts throughout, and in which:

Fig. 1 is a plan view of the front of a sealed case or shield in the form of a credit card, for example, as prepared in blank and ready to be completed by writing, printing or otherwise inscribing data thereon;

Fig. 2 is a view similar to Fig. 1 showing the completed credit card, or the like, in accordance with the invention;

Fig. 3 is an expanded sectional view on line 3—3 of Fig. 1, looking in the direction of the arrows, and;

Fig. 4 is an expanded sectional view similar to Fig. 3 showing an alternate form of this embodiment of the invention.

Fig. 5 is a plan view similar to Fig. 1 showing another form of credit card in accordance with the invention as prepared in blank ready for use, and;

Fig. 6 is an expanded sectional view of Fig. 5 on line 6—6, looking in the direction of the arrows.

Figs. 7-9, inclusive, illustrate a further embodiment of the invention in which Fig. 7 is a plan view of a document or instrument conveying information which is provided by a transparent outer shield having a data carrying surface on its rearward side which is visible through said shield;

Fig. 8 is a sectional view of Fig. 7 along line 8—8, and;

Fig. 9 is a front plan view of the instrument or document shown in Fig. 7 as folded and completed as a sealed case in one use of the invention.

While the invention is described in connection with its use as an identification device in the form of a plate, card or tag commonly known as a credit card, it will be appreciated that the invention is not in any way limited to such use, but rather, is equally adaptable to a wide range and variety of other applications and uses.

Referring now, more particularly, to the drawings, Figs. 1-3, inclusive, disclose a preferred embodiment of the invention wherein Fig. 2 illustrates an example of the general appearance of the front of a completed identification plate P, provided in the form of a signature type of credit card, or the like, contained in a sealed case or shield. Such a credit card is shown as of the general kind prepared for use substantially as illustrated in Fig. 1 with an unsigned signature area to be inscribed with the signature of the person to whom the identification plate is issued, and other blank areas to be inscribed with identification data and information regarding the subject and purpose of the credit card. When such signature, data and information have been inscribed, there is provided the completed and validated credit card or identification plate shown in Fig. 2 with the signature, data and related information sealed therein against change or alteration.

In a preferred construction, the plate P or credit card is provided by a pair of plate or case members A, B, defined by a folded sheet of any suitable transparent or translucent plastic material such as Vinylite, or the like. In a generally similar arrangement, the front plate member A may be provided in any desired manner by a piece of such transparent or translucent plastic sheet material with the back plate B made of thin sheet metal or fibre or composition sheet material, or the like. In either construction, the front plate member A made of transparent plastic sheet material is provided on its inner or rear face, Fig. 3, with a suitable coating or treatment defining what may be termed a data surface 10 on said inner or rear face of the front plate A. A sheet of carbon paper or other suitable reproducing means 15 is provided with its carbon face adjacent said data surface 10, and accordingly, when any inscription is made on either plate member A or B, an image of such inscription is reproduced on the data surface 10. Preferably, said carbon paper 15 is provided with a tab portion 16 projecting out of one end of the case defined by the secured plate members A, B, to facilitate removal thereof upon completion of the identification plate or credit card, as presently to be described.

The data surface 10 on the inner or rear face of the case or plate member A is provided in any suitable manner by a white or light colored printing ink, paint, or the like, or by tinting, etching or otherwise treating such surface to provide the same in the manner of a frosting of any desired color. In any case, such data surface 10 resembling a frosting, tinting, or the like, defines a distinct background surface contrasting to the transparency or translucency of the front plastic plate A. The data surface 10 otherwise is such that the carbon sheet 15 reproduces thereon an image of an inscription made on either plate member, A or B, and in such a way that the image is readily visible from the front of the plate P through the transparent case member A and said data surface 10.

As illustrated in Fig. 1, the identification plate or case P is prepared for use with the folded plate members A, B, secured together along an end edge 11 and along a side edge 12, as indicated by the stippling, by means of adhesive, heat and/or pressure or other suitable securing means but in a manner whereby the carbon sheet 15 may be readily removed by a pull on the projecting tab portion 16. The case, accordingly, is initially secured on three edges which, in effect, provides the same as a sealed case which prevents access to the data surface 10 therein except by mutilating or deforming the case. The remaining edge may be partly sealed or provided with a flap 13 on one plate member adapted to be folded over and secured to the other plate member, as shown in Fig. 2, to seal the case completely along all four edges. To this end, such a flap 13 may be provided with a coating of adhesive and a strip overlying said adhesive and adapted to be removed to expose the adhesive when it is desired to secure said flap 13 in providing a completely sealed identification plate or card P after the desired data has been provided thereon.

The identification plate P, as prepared in blank as shown in Fig. 1, may be provided with any suitable preprinted matter indicating the title of the document or instrument, advertising matter, directions, rules, etc., of the establishment issuing the same. Such preprinted matter may be printed in any suitable color on the outer or inner face of either the front or back plate members A, B, respectively. Preferably such preprinted matter is printed on the inner face of the front plate member A at the same time that the data surface 10 is printed thereon, such that the printing process is simplified and the preprinted matter is protected against wear by the front plate member A.

In the present example, the identification plate P is provided in the general form of a credit card issued by a gasoline company, and accordingly, such preprinted matter is shown comprising the title of the company 1, information 2 indicating the area where the signature of the owner of the credit card is to be inscribed, wording 3 showing where the name and address of the owner is to be typed or inscribed by an address plate, data 4 designating where the number of the credit card is to be typed or written and the expiration date thereof, and wording 5 designating the area for inserting the information of the license issued on the owner's vehicle.

The credit card, as thus prepared for use, appears substantially as shown in Fig. 1, ready to be provided with the name, address, signature of the party to whom the credit card is issued and the other data, aforesaid. The credit cards in blank, are advantageously prepared on a quantity basis in a manner whereby the names and addresses of a list of customers may be quickly provided on the cards by means of address plates and this data also used in mailing the cards to the customers. As seen in Fig. 2, this data would appear in the area 3 and, of course, the same may be typed or written in together with the number and expiration date of the card in the area 4, and also the information in area 5 on the license of the vehicle which is operated by the owner of the credit card.

When the credit card thus provided is delivered to the owner, the signature of the owner is readily produced in the area 2 by any suitable means such as a pencil, stylus, or ball point pen applied directly to the outer plate member A. Through the medium of the carbon sheet 15 or other reproducing means, all the foregoing data including the owner's signature is reproduced by corresponding images formed on the data surface 10 which are visible through said data surface 10 and the transparent front case member A. As the signature is written, the image thereof on the data surface 10 is visible to the writer and this permits the writer to see the formation of his signature as usually written and thus ensures an accurate reproduction of the writer's usual signature. In the use of an address plate to provide the data in the area 3, the address plate may be impressed on either the front case member A or back case member B to produce the same image on the data surface 10 by means of the carbon sheet 15.

After the signature is so provided, the carbon or reproducing sheet 15 is readily withdrawn from the case by a simple pull on the projecting tab portion 16. In asmuch as the case is sealed along three edges, the case is sufficiently sealed, for most purposes, in a manner whereby the necessary access to the signature and other data within the case to change or alter the same cannot be obtained without mutilating or deforming the case which, of course, would indicate that the credit card has been tampered with and should not be honored. In the event that a completely sealed case is desired, the same is provided with the flap 13, as aforesaid, coated with adhesive, bonding cement or other means for securing said flap so that the case is completely sealed along all four edges.

The credit card is then in complete and validated form, as shown in Fig. 2, with all information on the data surface 10 sealed therein against change or alteration and otherwise visible through said data surface 10 and the transparent front case member A.

From the foregoing, it will be appreciated that in accordance with the invention, sealed identification plates or cards having practically any design and preprinted matter, as aforesaid, may be prepared in quantity and ready, when issued, to be signed and inscribed with selected data in completed form without further handling which, of course, is highly advantageous where the identification plates are mailed out to the many customers of a large concern, and likewise, in various instances where speed and facility are necessary or desirable in issuing a large number of identification plates or credit cards, or the like.

Fig. 4 illustrates an alternate form of the invention described with reference to Figs. 1-3, inclusive, wherein a similar identification plate P comprising a folded transparent or translucent plastic sheet has the inner face of both the front plate member A and back plate member B provided with data surfaces 10a and 10b, respectively. In this form of the invention, the data surface 10a on the inner face of the front plate member serves the same purpose as that described with reference to Figs. 1-3, inclusive, while the data surface 10b on the back plate cooperates therewith to provide a more pronounced and deeper contrasting background for the data reproduced on the data surface 10a. If desired, the carbon sheet 15 may be provided with carbon on both faces, such that the signature and other data inscribed will be reproduced in duplicate, aligned images on both the data surfaces 10a and 10b, which together provide a darker and more pronounced showing through the transparent front plate member A after the carbon sheet 15 has been removed, as aforesaid.

Figs. 5 and 6 disclose a further embodiment of the invention which is generally similar in construction and use to that described with reference to Figs. 1-3, inclusive, except that the data surface 20 is provided on the inner face of the back plate member B while the removable reproducing sheet 25 comprises a carbon layer 26 having carbon on both faces and an overlying layer of light colored onion skin or tissue paper 27 adjacent the transparent or translucent front plate member A. Accordingly, as the signature or any other data is inscribed on the front plate member A, an image thereof is formed on the data surface 20 through the adjacent back face of the double-faced carbon layer 26, Fig. 6. At the same time, the front face of said carbon layer 26 forms on the tissue paper 27 a similar image of the signature which is visible to the writer through the transparent front case member A. This, likewise, permits the writer to see the formation of his signature as usually written and thus ensures an accurate reproduction of the writer's usual signature on the data surface 20.

Figs. 7-9, inclusive, illustrate another form of invention which incorporates the general principles of that described with reference to Figs. 1-3, inclusive, in providing a document or instrument with a protective outer surface defined by a similar sheet of transparent or translucent plastic material 30 having a data surface 31 such as frosting, or the like, printed or otherwise formed on the rear face thereof. A carbon sheet 35 is provided with its carbon face adjacent said data surface 31 and preferably said carbon sheet 35 is removably attached along one edge to the plastic sheet 30 as by a film of adhesive 36, Fig. 8. The carbon sheet 35 may, of course, extend the full length of the plastic sheet 30 for use in providing a document or instrument in any enlarged size in the form of a permit, certificate, license, diploma, map, or other valuable paper on which a signature and other data may be written, typed or otherwise inscribed by means applied to the plastic sheet 30 to reproduce an image of the inscribed data on the data surface 31, substantially as described with reference to Figs. 1-3, inclusive. Likewise, the document may be provided with preprinted data on the data surface 31 such as the title of the document, wording indicating where there is to be typed the name and address of the person to whom the document is issued, and wording indicating the area of the signature of the validating officer to be inscribed, substantially as shown in Fig. 7, for example.

When the signature and other desired data is inscribed on the data surface 31 through the medium of the carbon sheet 35, the carbon sheet is torn off whereupon the completed document or instrument may be used flat and unfolded, as seen in Fig. 8, as for example, in the manner of a license to be hung on a wall, or as a document used in a file or book and subject to wear because of frequent handling. The plastic sheet 30 protects data surface 31 on the rear face thereof against soiling and wear due to frequent handling and otherwise provides a stronger and more durable document or instrument than conventional paper, and which, if desired, may be washed to clean the same without marring the data on the data surface 31.

As illustrated in Figs. 7 and 9, when the carbon sheet 35 has been removed, this form of the invention may also be provided as a sealed case by using the top portion of the plastic sheet 30 for the inscribed data and folding thereunder the bottom portion 30a and securing these top and bottom portions together by any suitable means such as adhesive or binding cement along the edges thereof as indicated by the stippling 38, Fig. 9. In this regard, the frosting 31 on the return folded bottom portion 30a of the plastic sheet serves as a background for the inscribed data on the data surface 31 on the upper portion of the sheet to provide for a deeper and more pronounced showing of such data through the transparent front portion of the case shown in Fig. 9.

While the invention has been described in detail with specific examples, such examples are intended as illustrations only inasmuch as it will be apparent that there are numerous possible modifications and variations in the construction, arrangement and general combination of elements and details which fall within the spirit and scope of this invention. The present embodiments are therefore to be considered in all respects as illustrative and not restrictive, the scope of the invention being indicated by the appended claim rather than by the foregoing description, with all changes falling within the scope, meaning, and range of equivalency of the claim intended to be embraced therein.

What is claimed is:

A sealed case comprising a pair of front and back case members provided from plastic sheet material, a contrasting frosted surface which is relatively hard and smooth provided directly on the inner faces of both of said case members, the contrasting frosted surface on the inner face of the front case member defining a data surface adapted to receive an inscription which is visible from the outer face of said front case member, a removable reproducing sheet associated with said data surface adapted to reproduce on said data surface an image of an inscription made on a case member and transmitted to said reproducing sheet, the contrasting frosted surface on the inner face of the back case member serving as a background for the image reproduced on said data surface whereby said image has a pronounced well defined appearance, said case members being secured together to seal said data surface in the case against access, and said case having a preformed passage providing for the removal of said reproducing sheet without mutilating or destroying said sealed case.

WILLIAM H. WOLOWITZ.

References Cited in the file of this patent

UNITED STATES PATENTS

| Number | Name | Date |
|---|---|---|
| 927,543 | Irvin | July 13, 1909 |
| 1,266,368 | Winton | May 14, 1918 |
| 1,270,066 | Spence | June 18, 1918 |
| 1,368,518 | Mayne | Feb. 15, 1921 |
| 2,074,855 | Paasche | Mar. 23, 1937 |
| 2,156,289 | Hoy | May 2, 1939 |
| 2,520,077 | Wolowitz | Aug. 22, 1950 |
| 2,556,825 | Smith | June 12, 1951 |
| 2,588,572 | Potteiger | Mar. 11, 1952 |

FOREIGN PATENTS

| Number | Country | Date |
|---|---|---|
| 528,680 | Great Britain | Nov. 5, 1940 |
| 529,818 | Great Britain | Nov. 28, 1940 |